US 6,685,792 B2

(12) United States Patent
Veligdan et al.

(10) Patent No.: US 6,685,792 B2
(45) Date of Patent: Feb. 3, 2004

(54) METHOD OF MAKING A SMALL INLET OPTICAL PANEL

(75) Inventors: James T. Veligdan, Manorville, NY (US); David E. Slobodin, Lake Oswego, OR (US)

(73) Assignee: Brookhaven Science Associates, Upton, NY (US)

(*) Notice: Subject to any disclaimer, the term of this patent is extended or adjusted under 35 U.S.C. 154(b) by 159 days.

(21) Appl. No.: 09/839,812

(22) Filed: Apr. 20, 2001

(65) Prior Publication Data

US 2001/0014199 A1 Aug. 16, 2001

Related U.S. Application Data

(60) Division of application No. 09/318,933, filed on May 26, 1999, now Pat. No. 6,222,971, which is a continuation-in-part of application No. 09/118,270, filed on Jul. 17, 1998, now abandoned.

(51) Int. Cl.[7] ............................................... B32B 31/18
(52) U.S. Cl. ....................... 156/256; 385/120; 385/121; 385/32; 385/50; 156/250
(58) Field of Search ................................. 156/253, 256, 156/157–159, 250; 385/120–121, 115–116, 32, 42, 50, 51; 349/62, 65; 362/511; 65/386; 83/29

(56) References Cited

U.S. PATENT DOCUMENTS

| 3,402,000 A | * | 9/1968 | Crawford ..................... 385/116 |
|---|---|---|---|
| 3,573,459 A | * | 4/1971 | Siegmund ................ 250/483.1 |
| 3,874,783 A | | 4/1975 | Cole |
| 4,116,739 A | | 9/1978 | Glenn |
| 4,586,781 A | | 5/1986 | Gunther et al. |
| 5,066,947 A | | 11/1991 | Du Castel |
| 5,455,882 A | | 10/1995 | Veligdan |
| 5,684,905 A | * | 11/1997 | Sugawara et al. .......... 385/120 |
| 5,764,845 A | | 6/1998 | Nagatani et al. |
| 5,914,760 A | | 6/1999 | Daiku |
| 5,923,806 A | * | 7/1999 | Sugawara ................... 385/121 |
| 5,940,565 A | | 8/1999 | Sugawara |
| 6,400,876 B1 | * | 6/2002 | Biscardi et al. ............. 385/120 |

* cited by examiner

Primary Examiner—Michael W. Ball
Assistant Examiner—Jessica Rossi
(74) Attorney, Agent, or Firm—Reed Smith LLP; William J. McNichol, Jr.; Matthew J. Esserman

(57) ABSTRACT

An optical panel having a small inlet, and a method of making a small inlet optical panel, are disclosed, which optical panel includes a individually coating, stacking, and cutting a first plurality of stacked optical waveguides to form an outlet face body with an outlet face, individually coating, stacking, and cutting a second plurality of stacked optical waveguides to form an inlet face body with an inlet face, and connecting an optical coupling element to the first plurality and second plurality of stacked optical waveguides, wherein the optical coupling element redirects light along a parallel axis of the inlet face to a parallel axis of the outlet face. In the preferred embodiment of the present invention, the inlet face is disposed obliquely with and askew from the outlet face.

14 Claims, 4 Drawing Sheets

METHOD OF MAKING A SMALL INLET OPTICAL PANEL

CROSS REFERENCE TO RELATED APPLICATIONS

This application is a divisional of U.S. patent application Ser. No. 09/318,933, filed May 26, 1999, U.S. Pat. No. 6,222,971 and entitled "SMALL INLET OPTICAL PANEL AND A METHOD OF MAKING A SMALL INLET OPTICAL PANEL", which is a continuation-in-part of U.S. patent application Ser. No. 09/118,270, filed Jul. 17, 1998, and entitled "SMALL INLET OPTICAL PANEL", now abandoned.

STATEMENT REGARDING FEDERALLY SPONSORED RESEARCH OR DEVELOPMENT

This invention was made with Government support under contract number DE-AC02-98CH10886, awarded by the U.S. Department of Energy. The Government has certain rights in the invention.

BACKGROUND OF THE INVENTION

1. Field of the Invention

The present invention is directed generally to a planar optical display, and, more particularly, to a small inlet optical panel and a method of making a small inlet optical panel.

2. Description of the Background

It is known in the art to form an optical panel from a plurality of stacked waveguides. The waveguides collectively define an inlet face at one end of the waveguides and an outlet face at an opposite end. The outlet face may be disposed obliquely with the inlet face. The outlet face may form an small acute face angle with the longitudinal axes of the waveguides, thus allowing the height of the screen to be substantially larger than the depth or thickness of the panel. The panel inlet face generally extends the fill width of the panel correspondent to the width of the outlet face, but is very narrow due to the thinness of the panel. For example, where an inlet face has a width of 133 cm, the corresponding length in the prior art would be 2.54 cm.

The narrow inlet face necessitates the use of a complex light projection system for distributing and focusing the image light across the full width and depth of the panel, thereby allowing for accurate display on the outlet face. This complex light projection system increases the complexity and cost of the overall system, and increases the space requirements of the display panel.

Therefore, the need exists for a waveguide optical panel having an aperture inlet which allows for simplification of light projection and focusing at the inlet, without a loss of image resolution at the outlet face.

BRIEF SUMMARY OF THE INVENTION

The present invention is directed to a small inlet optical panel, which includes a first plurality of stacked optical waveguides which forms an outlet face body with an outlet face, which includes a second plurality of stacked optical waveguides which forms an inlet face body with an inlet face, and an optical coupling element connected to the first plurality and to the second plurality, wherein the optical coupling element redirects light along a parallel axis of the inlet face to a parallel axis of the outlet face. In the preferred embodiment of the present invention, the inlet face is disposed obliquely with and askew from the outlet face.

The present invention is also directed to a method of making a small inlet optical panel which includes individually coating a plurality of glass sheets in a substance having an index of refraction lower than that of the glass sheets, stacking the plurality of coated glass sheets, wherein each coated glass sheet is fastened to an adjoining glass sheet using an adhesive, applying pressure to the stack, curing the adhesive, cutting the stack to form an outlet face body having a first wedge shape with an outlet face thereon, repeating the individually coating, the stacking, the applying and the curing to form a second stack, cutting the second stack to form an inlet face body having a second wedge shape correspondent to the first wedge shape and having an inlet face thereon, and joining together the inlet face body and the outlet face body at an optical coupling element, wherein the outlet face is disposed askew from the inlet face, for redirecting light incident into the inlet face body to a direction incident into the outlet face body.

The present invention solves difficulties encountered in the prior art by providing a waveguide optical panel having a small aperture inlet, which allows for simplification of light projection and focusing at the inlet, without a loss of image resolution at the outlet face.

BRIEF DESCRIPTION OF THE SEVERAL VIEWS OF THE DRAWINGS

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical optical display panel. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
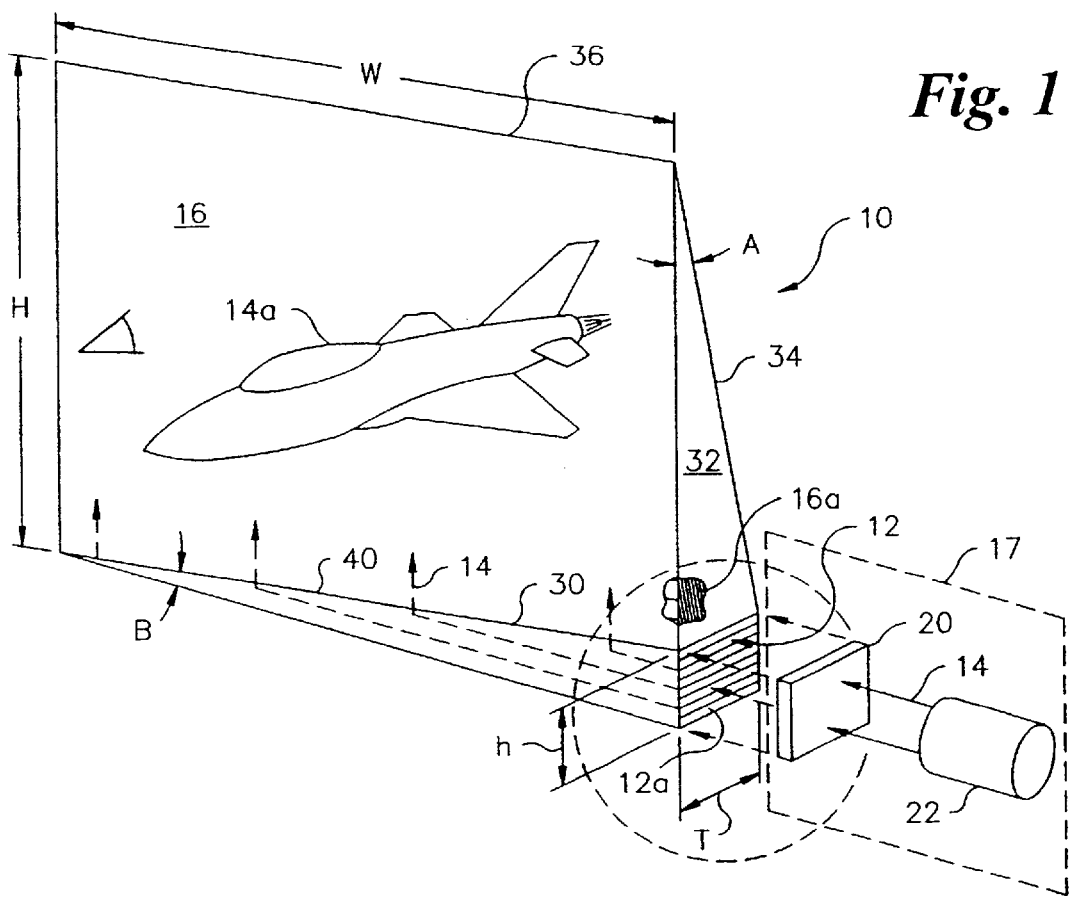
FIG. 1 is an isometric view schematic illustrating a small inlet optical panel.

FIG. 1 is an isometric view schematic illustrating a small inlet optical panel 10. The display panel 10 includes an inlet face 12 for receiving light 14, and an outlet face 16 disposed obliquely with and askew from the inlet face 12 for displaying light 14. The light 14 is generated by a light generator 17. The inlet face 12 and outlet face 16 are each formed by a plurality of waveguides 12a, 16a, wherein one end of each waveguide 12a, 16a forms an inlet for that waveguide 12a, 16a, and wherein the opposite end of each waveguide 12a, 16a forms an outlet for that waveguide 12a, 16a.

The inlet face 12 is preferably disposed generally perpendicular to and askew from the outlet face 16 for receiving the light 14 from the modulator 20 and projector 22. The horizontal extension of each waveguide 12a of the inlet face 12 is disposed below and substantially perpendicular to the horizontal extension of each waveguide 16a of the outlet face 16. The plurality of stacked waveguides 12a of the inlet face 12 extends vertically.

Each waveguide 16a extends horizontally, and the plurality of stacked waveguides 16a extends vertically, along the outlet face 16. The light 14 is displayed on the outlet face 16 in a form such as, but not limited to, a video image 14a The outlet face 16 may be generally formed into a triangular wedge having an acute face angle A between the bottom 30 of the body 32 of the outlet face 16 and the back 34 of the body 32 of the outlet face 16. The acute face angle A may be in the range of about 5 to 10 degrees, for example, with the panel 10 increasing in thickness from a minimum at the top 36 of the body 32 of the outlet face 16, to a maximum thickness at the bottom 30 of the body 32 of the outlet face 16. The maximum thickness may be chosen as small as is practicable in a given application. The panel 10 has a height from the top to the bottom of the outlet face 16, and a width from the left to the right of the outlet face 16. The width and height may be selected to produce width to height aspect ratios of 4:3 or 16:9, for example, for uses such as a typical television application. In an exemplary embodiment of the outlet face 16 of the present invention, a maximum thickness in the range of about 8 cm may be chosen, in conjunction with a height of 100 cm and a width of 133 cm. The left to right width of the inlet face 12 is chosen to be the same as the maximum thickness T of the panel 10. The inlet face 12 has a suitable vertical height h, which is a matter of design choice. The inlet face 12 has a width to height aspect ratio which, for the purpose of ease of interface with the outlet face 16, is preferably also 4:3. Correspondingly, the panel 10 diverges in two wedge shapes, one from the bottom 30 to the top 36 of the outlet face body 32, and the second at the bottom 30 of the outlet face body 32, from the left of the interface 40 to the inlet face 12.

The disposition of the inlet face 12 with the outlet face 16 necessitates the redirection of the light 14, which light 14 is incident on the inlet face 12 in an approximately horizontal plane and must be redirected to a vertically upwardly direction through the waveguide 16a of the outlet face 16. This periscopic optical path permits the use of a relatively small area modulator 20 at the bottom of the panel 10 to provide a small aperture light source which is expanded through the panel 10 for display on the outlet face 16 at a substantially increased viewing area.

The light generator 17 generates light 14 and passes the light 14 to inlet face 12, and the surface area of light generation immediately adjacent to the inlet face 12 preferably is equivalent to the surface area of the inlet face 12. The light generator 17 may include a light source 22, a light modulator 20, or imaging optics. The light 14 may be initially generated by the light source 22. The light source 22 may be, for example, a bright incandescent bulb, a laser, a plurality of phosphors, at least one LED, at least one OLED, at least one FED, or a projector. The light 14 from the source 22 is preferably collimated. The light 14 may be modulated by the modulator 20 for defining individual picture elements, known in the art as pixels. The modulator 20 may take a form known in the art, such as, but not limited to, a liquid crystal display (LCD), a Digital Micromirror Device (DMD), a GLV, a raster scanner, a vector scanner, a PDLC, an LCOS, a MEMS, and a CRT. The imaging optics may include light folding mirrors or lenses. The imaging optics may be optically aligned between the inlet face 12 and the light modulator 20 for compressing or expanding and focusing the light 14 as required to fit the inlet face 12. The modulated light 14 is generally incident on the inlet face 12 from the imaging optics as a compressed image which is transmitted horizontally through the inlet face 12, turned for transmission vertically upwardly through the outlet face body 32 for display, and expands for suitable horizontal and vertical resolution and scale.

Figure 2:
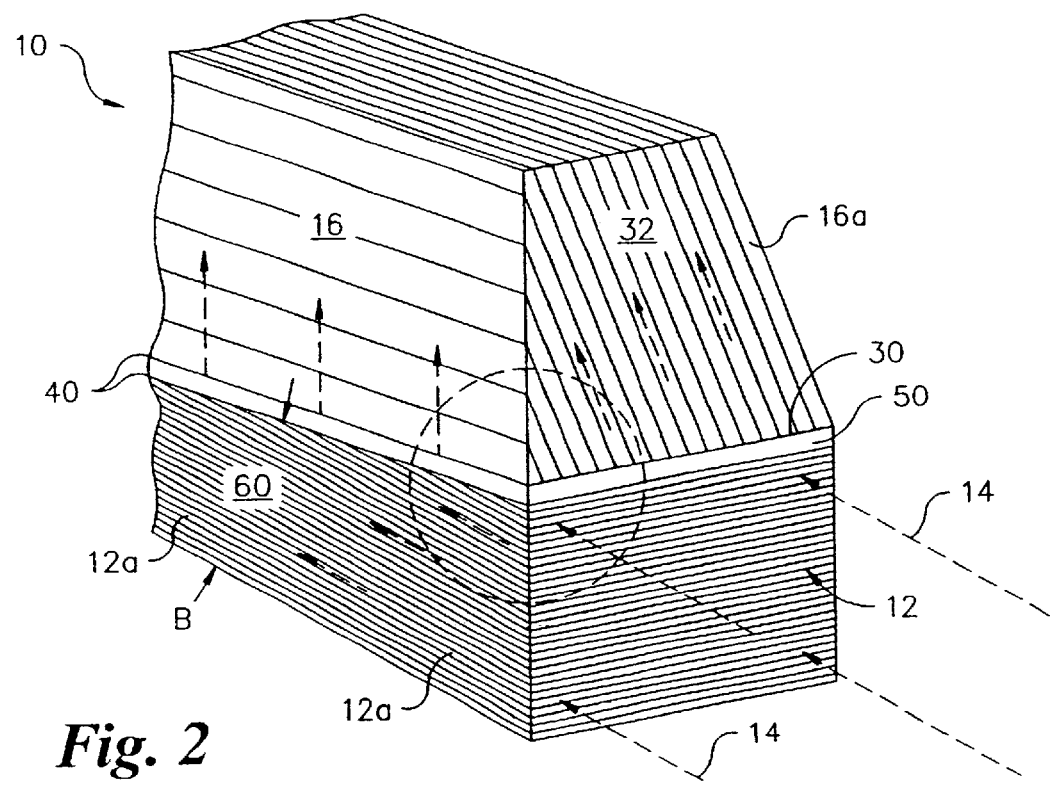
FIG. 2 is an isometric view schematic illustrating a horizontal and vertical cross-section of a small inlet optical panel.

FIG. 2 is an isometric view schematic illustrating a horizontal and vertical cross-section of a small inlet optical panel 10 of FIG. 1. The panel 10 includes a first, or top, plurality of stacked optical waveguides 16a forming an outlet face 16, a second, or bottom, plurality of stacked waveguides 12a stacked perpendicularly to the outlet face 16 to form an inlet face 12 below the bottom 30 of the body 32 of the outlet face 16, and a light redirection element 50 disposed inside the panel 10 at the interface 40 between the inlet face waveguides 12a and the outlet face waveguides 16a for redirecting the light 14 for periscopic transmission through the waveguides 12a, 16a.

The waveguides 12a, 16a are configured in two independent groups with the first plurality of waveguides 16a forming a wedge defining the outlet face 16 and the interface 40. The second plurality of waveguides 12a are disposed below the light redirection element 50 at the interface 40, and forms a wedge defining the inlet face 12. The second plurality of waveguides 12a are configured in a wedge correspondent to the wedge shape of the outlet face body 32. The body 32 of the outlet face 16 wedge receives the light 14 for transmission vertically upwardly to the outlet face 16. The body 32 of the outlet face 16 receives light 14 to along the surface of the bottom 30 of the body 32, adjacent the light redirection element 50. The light 14 received at the bottom 30 of the body 32 is passed through the body 32, and is displayed on the outlet face 16. The body 60 of the inlet face 12 wedge receives the light 12 at its vertical inlet face 12 for transmission substantially horizontally to emission at the light redirection element 50. The inlet face 12 may be sized to match the area of the modulator 20 for receiving the light 14, and the inlet face 12 is also substantially smaller in area than the interface 40 at the light redirection element 50. The angle A of the outlet face 16 wedge may be about 5 to 10 degrees, and the second angle B of the inlet face 12 wedge is then be suitably smaller.

The plurality of stacked waveguides 12a, 16a used to form the inlet face 12 and the outlet face 16 may be formed of any material known in the art to be suitable for passing electromagnetic waves therethrough, such as, but not limited to, glass, plastics, polymers. The preferred embodiment of the present invention is implemented using individual glass sheets, which are typically approximately 2–40 microns thick. Two different thicknesses of glass sheet may be used simultaneously in a given application of the present invention, one to form the outlet face 16, and one to form the inlet face 12. In the preferred embodiment of the present invention, the glass sheets used within the inlet face 12 are approximately the same thickness, and the glass sheets used within the outlet face 16 are approximately the same thickness. The glass used may be of a type such as, but not limited to, glass type BK-7, or may be a suitable plastic laminate, such as Lexan®, commercially available from the General Electric Company®. The waveguides 12a, 16a are discussed with more particularity with respect to FIG. 3.

The light redirection element 50 is disposed between the body 60 of the inlet face 12 and the body 32 of the outlet face 16. The light redirection element 50 may be, for example, an optical coupling element, and may be fastened to each plurality of waveguides 12a, 16a using methods known in the art, such as an optically transparent epoxy. The function of the coupler 50 is to redirect the initially horizontally directed light 14 from the bottom plurality of waveguides 12a vertically upwardly into the top plurality of waveguides 16a. Both the waveguides 12a, 16a and the coupler 50 of the present invention are passive optical devices. The light redirection element 50 is discussed with more particularity with respect to FIG. 3.

Figure 3:
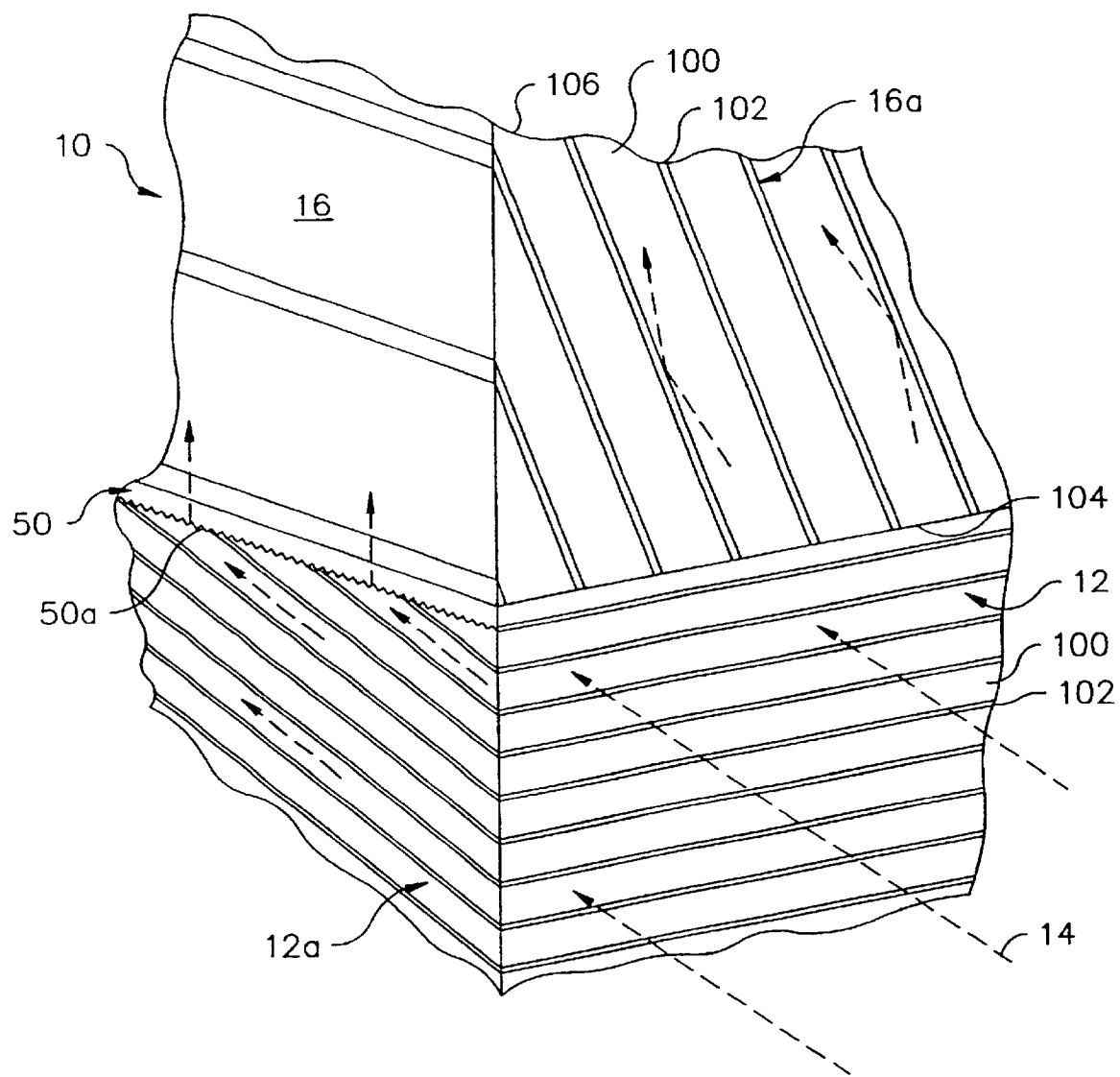
FIG. 3 is a schematic illustrating an exaggerated horizontal and vertical cross-section of the-small inlet optical panel.

FIG. 3 is a schematic illustrating an exaggerated horizontal and vertical cross section of the small inlet optical panel 10 embodied in FIG. 2. The light redirection element 50 redirects the light 14 flowing into the inlet face 12, which then flows through the bottom plurality of waveguides 12a and is thereby incident on the light redirection element SO, to flow into the top plurality of waveguides 16a, and thereby be incident on the outlet face 16. The light redirection element 50 preferably includes a plurality of fresnel prismatic grooves 50a which are straight along the width of the bottom waveguides 12a in the direction of the panel thickness T for redirecting the image light 14 vertically upwardly into the top plurality of waveguides 16a. In a preferred embodiment, the light redirection element 50 is an optical coupler 50 in the form of a Transmissive Right Angle Film (TRAF) II, which is commercially available from the 3M Company of St. Paul, Minn. The TRAF II coupler 50 is effective for turning the image light at an angle of up to approximately 90°. In an alternative embodiment of the present invention, the light redirection element 50 may be in the form of a diffractive grating 50, which diffractive grating 50 includes an extremely small series of straight gratings configured for optically diffracting the light 14 in order to turn the light flowing substantially horizontally through the bottom plurality of waveguides 12a vertically upwardly into the top plurality of waveguides 16a. The diffractive grating 50 has a lower turning angle capability than the TRAF II embodiment.

An individual waveguide 12a, 16a used in the present invention typically includes a cental core 100 laminated between cladding layers 102, a receiving end 104, and an outlet end 106. The central core 100 channels the image light 14 through the waveguide 12a, 16a, is disposed between cladding layers 102, and extends from the receiving end 104 to the outlet end 106. The central core 100 is, in the preferred embodiment, a glass sheet of thickness T in the range between 2 and 40 microns, as discussed hereinabove. The central core 100 has a first index of refraction. The cladding layers 102 also extend from the receiving end 104 to the outlet end 106. The cladding layers 102 may be black in color to improve contrast and brightness. Alternatively, a black layer maybe disposed between adjoining cladding layers 102 for absorbing ambient light at the outlet end 106, where the adjoining cladding layers 102 are transparent. The term black is used herein to encompass not only pure black color but additionally, any functionally comparable dark color suitable for use in the present invention, such as dark blue. The cladding layers 102 have a second index of refraction, lower than that of the central core 100, for ensuring total internal reflection of the image light 14 as it travels from the receiving end 104 to the outlet end 106.

The top plurality 16a and the bottom plurality 12a of stacked waveguides may be made by several methods. A plurality of glass sheets may be individually coated with, or dipped within, a substance having an index of refraction lower than that of the glass, and a plurality of coated sheets may then be fastened together using glue or thermally curing epoxy. Alternatively, the glue or epoxy could form the cladding layers and be applied directly to the glass sheets. In one embodiment of the present invention, a first coated or uncoated glass sheet is placed in a trough sized slightly larger than the first coated glass sheet, the trough is filled with a thermally curing black epoxy, and the coated or uncoated glass sheets are repeatedly stacked at an angle, forming a layer of epoxy between each coated or uncoated glass sheet. The stacking is preferably repeated until between approximately 500 and 800 sheets have been stacked. The number of waveguides 16a which are stacked to form the outlet face 16 are selected for providing a corresponding vertical resolution of the outlet face 16. For example, 525 of the waveguides 16a may be stacked in the outlet face 16 to produce 525 lines of vertical resolution in the outlet face 16. Uniform pressure may then be applied to the stack, followed by a cure of the epoxy, and a sawing of the stack into a wedge shape of an angle dependant on the use of the stack as an outlet face 16 or an inlet face 12. The wedge may be sawed curved or flat, and may be frosted or polished after sawing.

Figure 4:
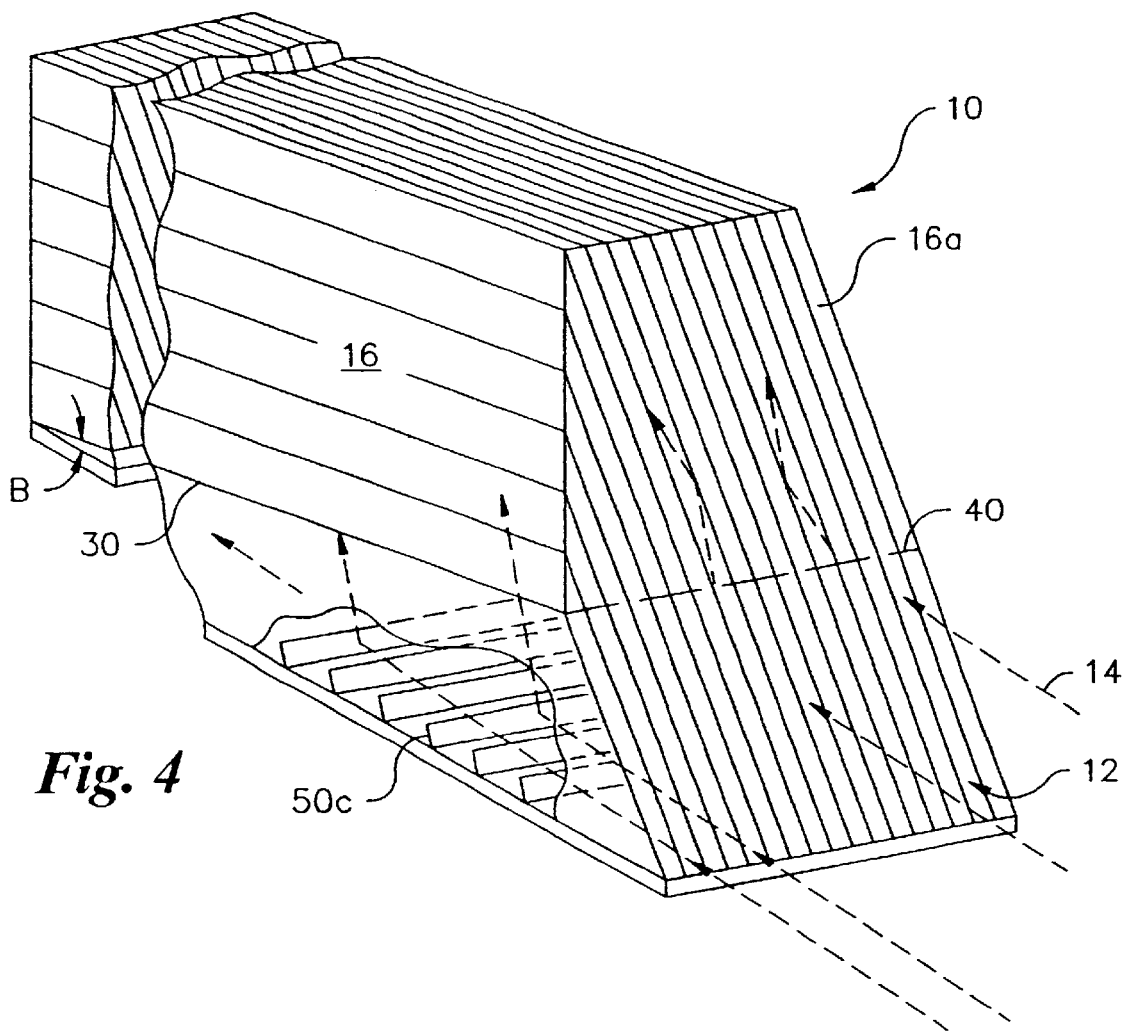
FIG. 4 is a horizontal and vertical cross section of the small inlet optical panel illustrating an alternative embodiment of the panel using one plurality of waveguides.

FIG. 4 is a horizontal and vertical cross section of the small inlet optical panel 10 illustrating an alternative embodiment of the panel 10. In this alternative embodiment, the top plurality of waveguides 16a extend vertically, continuously from the outlet face 16 to the side inlet face 12, with the interface 40 being horizontal and disposed at the bottom edge 30 of the outlet face 16.

In this alternative embodiment, the light redirection element 50c, is disposed at the bottom of the panel 10 and is inclined from the inlet face 12 at the right side of the outlet face 16 to the opposite side of the outlet face 16. The bottom of the plurality of waveguides 16a, as well as the element 50c, are therefore inclined at the small acute angle B from the bottom of the panel 10, thereby defining a bottom wedge portion. Also in this alternative embodiment, the element 50c includes a plurality of tilted reflective facets or mirrors 50c optically aligned between the inlet face 12 and the interface 40 for reflecting the substantially horizontally directed light 14 vertically upwardly to the outlet face 16.

Figure 5:
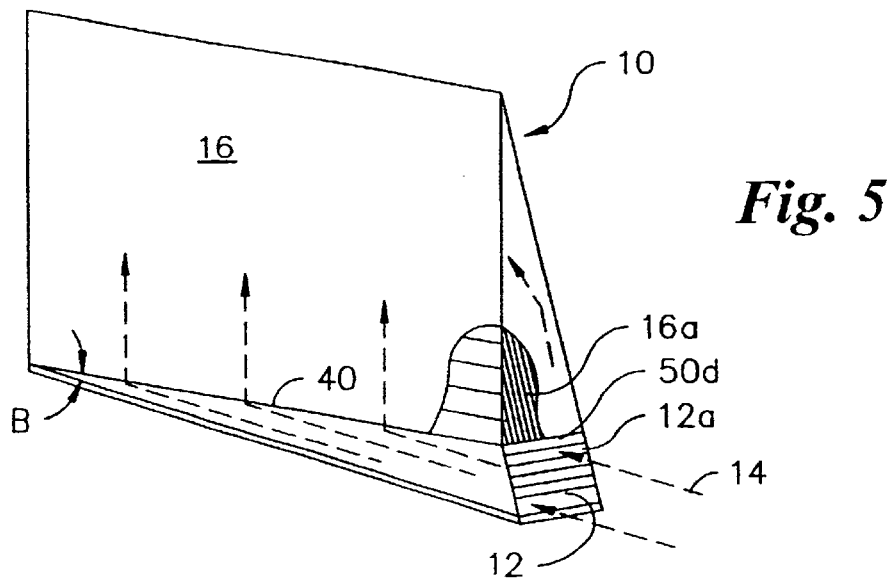
FIG. 5 is an isometric view schematic illustrating an alternative embodiment of the small inlet optical panel which includes an optical coupler in the form of a holographic optical element.

FIG. 5 is an isometric view schematic illustrating an alternative embodiment of the small inlet optical panel 10, and includes a light redirection element 50d in the form of a holographic optical element 50d configured to reflect the image light 14 from the inlet face 12 across the interface 40 for display on the outlet face 16. The holographic coupler 50d may take a conventional form known in the art for turning the light 14 from a substantially horizontal direction to the vertical direction required for internal transmission through the top plurality of waveguides 16a to the outlet face 16.

Figure 6:
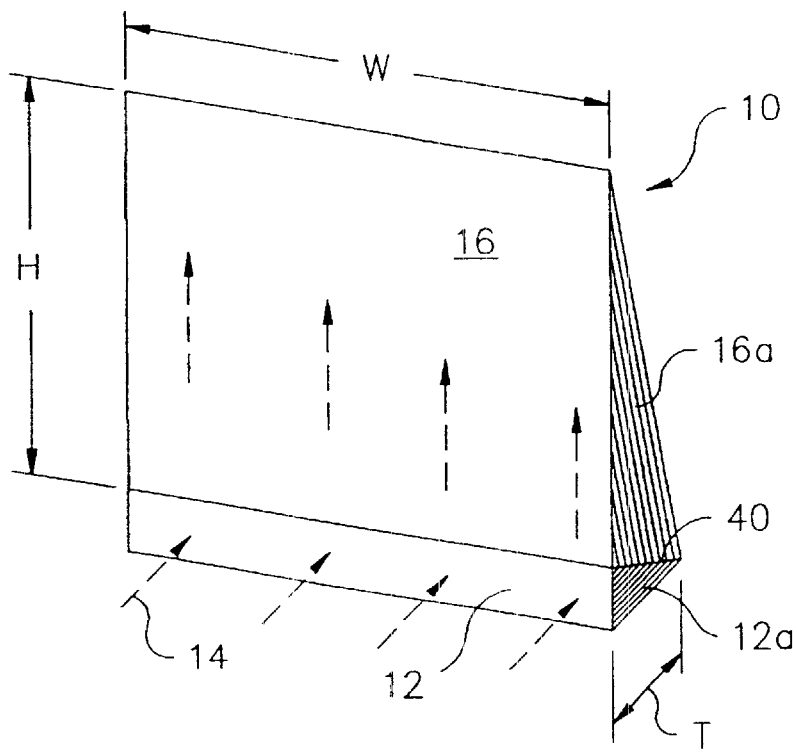
FIG. 6 is an isometric view schematic illustrating an alternative embodiment of the small inlet optical panel wherein the inlet face is coplanar with the outlet face.

FIG. 6 is an isometric view schematic illustrating an alternative embodiment of the small inlet optical panel 10, including a top plurality of waveguides 16a configured as in the above embodiments. The alternative embodiment of FIG. 7 also includes a bottom plurality of waveguides 12a which are continuous along the full width W of the outlet face 16 and are stacked vertically. In this embodiment, the inlet face 12 extends the full width W of the outlet face 16 directly below the outlet face 16 at the front of the panel 10.

Figure 7:
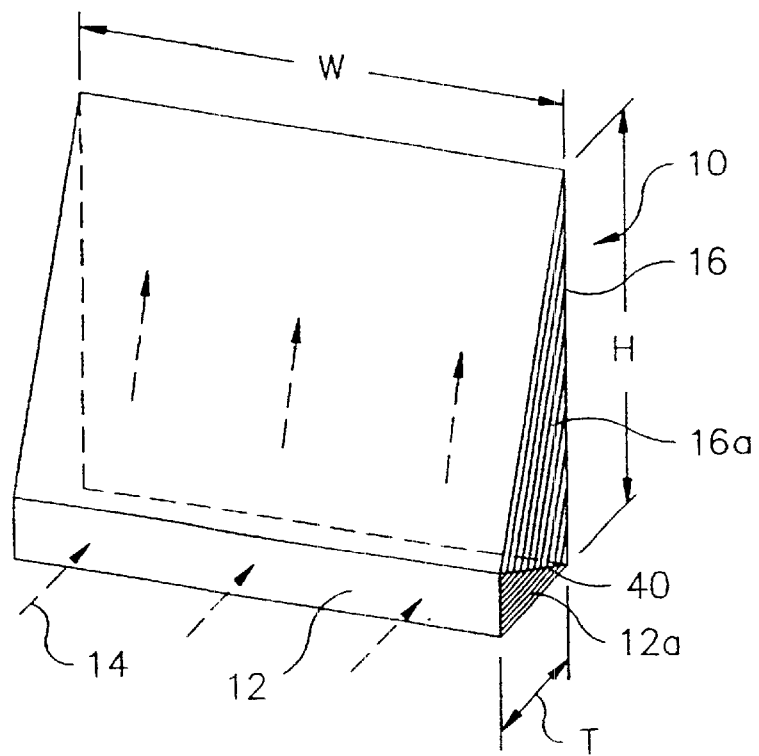
FIG. 7 is an isometric view schematic illustrating an alternative embodiment of the small inlet optical panel wherein the inlet face is opposite the outlet face.

FIG. 7 is an isometric view schematic illustrating an alternative embodiment of the small inlet optical panel 10, wherein the inlet face 12 extends the full width W of the outlet face 16, but is disposed at the back of the panel 10.

Those of ordinary skill in the art will recognize that many modifications and variations of the present invention may be implemented. The foregoing description and the following claims are intended to cover all such modifications and variations.

What is claimed is:

1. A method of making an optical panel, comprising:
   individually coating a plurality of sheets in a substance having an index of refraction lower than that of the sheets;
   stacking the plurality of coated sheets, wherein each coated sheet is fastened to an adjoining coated sheet using an adhesive;
   applying pressure to the stack; curing the adhesive;
   cutting the stack to form an outlet face body having a first wedge shape with an outlet face thereon;
   repeating said individually coating, said stacking, said applying, and said curing to form a second stack;
   cutting the second stack to form an inlet face body having a second wedge shape with an inlet face thereon, the inlet face being smaller in surface area than the outlet face in each of two dimensions; and
   joining together the inlet face body and the outlet face body at a light redirection element, wherein the outlet face is disposed askew from the inlet face, for redirecting light incident into the inlet face body to a direction incident into the outlet face body.

2. The method of claim 1, wherein said stacking is repeated until between about 500 and about 800 sheets have been stacked.

3. The method of claim 1, further comprising polishing the inlet face and the outlet face.

4. The method of claim 1, further comprising frosting the outlet face.

5. The method of claim 1, further comprising disposing a black layer between coated sheets during said stacking.

6. The method of claim 1, wherein the sheets comprise a material selected from the group consisting of polymers, plastics, and glass.

7. The method of claim 1, wherein the inlet face body is a triangular wedge located behind the inlet face and adjacent said light redirection element, and wherein the triangular wedge increases in thickness from an end of the triangular wedge opposite the inlet face, to the inlet face.

8. The method of claim 1, wherein the inlet face body has a height across a vertical of the inlet face, and a width across a horizontal of the inlet face.

9. The method of claim 8, wherein the width to the height aspect ratio is 4:3.

10. A method of making an optical panel, comprising:
    individually coating a plurality of sheets in a substance having an index of refraction lower than that of the sheets;
    stacking the plurality of coated sheets, wherein each coated sheet is fastened to an adjoining coated sheet using an adhesive;
    applying pressure to the stack;
    curing the adhesive;
    cutting the stack to form an outlet face body having a first wedge shape with an outlet face thereon;
    repeating said individually coating, said stacking, said applying, and said curing to form a second stack;
    cutting the second stack to form an inlet face body having a second wedge shape with an inlet face thereon, the inlet face being smaller in surface area than the outlet face in each of two dimensions; and
    joining together the inlet face body and the outlet face body at a light redirection element, wherein the outlet face is disposed askew from the inlet face, for redirecting light incident into the inlet face body to a direction incident into the outlet face body;
    wherein the outlet face body is a triangular wedge between the outlet face and a back of the outlet face body, and wherein the triangular wedge increases in thickness from a top of the outlet face body to said light redirection element.

11. The method of claim 10, wherein the triangular wedge shape has an angle in the range of about 5 degrees to about 10 degrees.

12. The method of claim 1, wherein the outlet face body has a height across a vertical of the outlet face, and a width across a horizontal of the outlet face.

13. The method of claim 12, wherein the width to the height aspect ratio is 4:3.

14. A method of making an optical panel, comprising:
    individually coating a plurality of sheets in a substance having an index of refraction lower than that of the sheets;
    stacking the plurality of coated sheets, wherein each coated sheet is fastened to an adjoining coated sheet using an adhesive;
    applying pressure to the stack;
    curing the adhesive;
    cutting the stack to form an outlet face body having a first wedge shape with an outlet face thereon;
    repeating said individually coating, said stacking, said applying, and said curing to form a second stack;
    cutting the second stack to form an inlet face body having a second wedge shape with an inlet face thereon, the inlet face being smaller in surface area than the outlet face in each of two dimensions; and
    joining together the inlet face body and the outlet face body at a light redirection element, wherein the outlet face is disposed askew from the inlet face, for redirecting light incident into the inlet face body to a direction incident into the outlet face body;
    wherein the optical panel comprises two triangular wedges, one of said triangular wedges is the outlet face body which increases in thickness from a top to a bottom of the outlet face body, and the other triangular wedge is the inlet face body which increases in thickness from the light redirection element to the inlet face an end of the inlet face body opposite the inlet face, to the inlet face.

* * * * *